Aug. 19, 1952      G. S. STEVENS      2,607,836
TIRE SAFETY INDICATOR
Filed Sept. 29, 1950
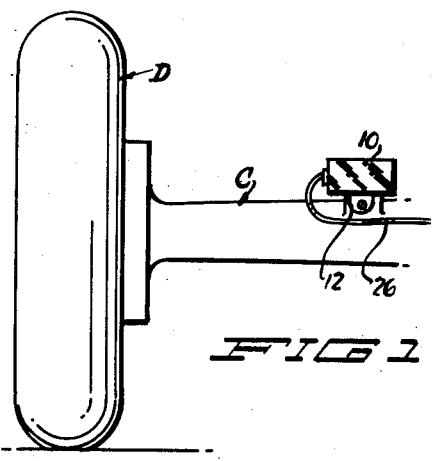
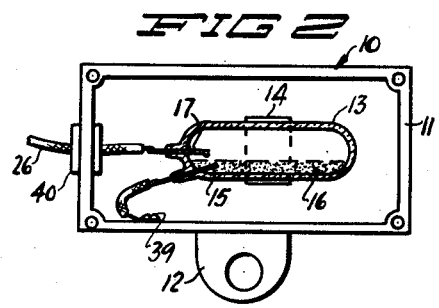
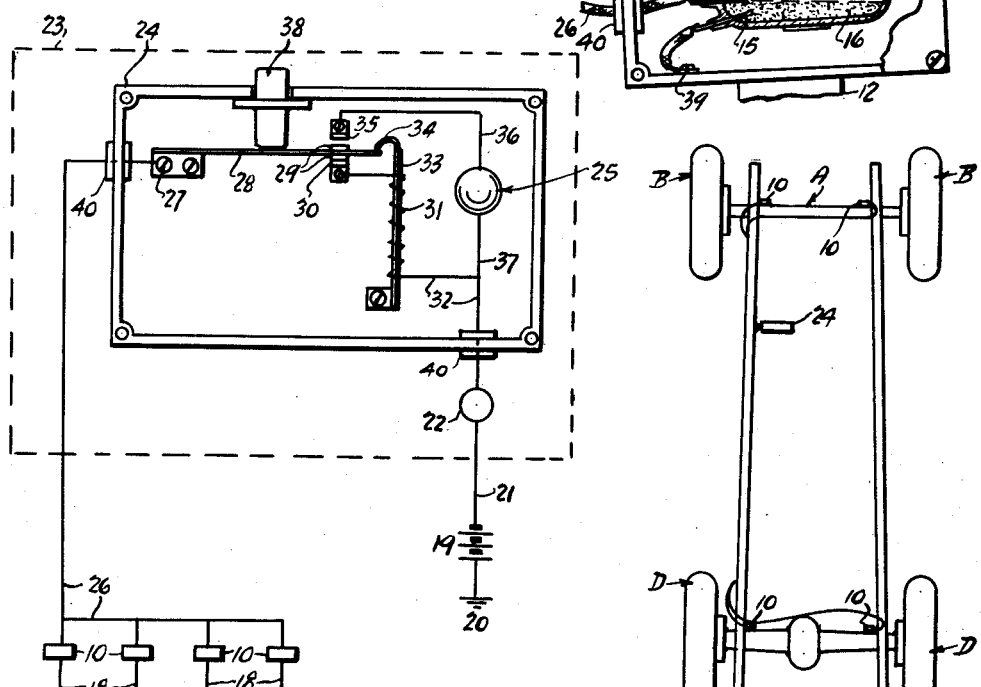
INVENTOR
GEORGE S. STEVENS
BY 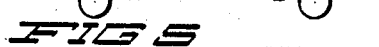
ATTORNEY Patented Aug. 19, 1952

2,607,836

UNITED STATES PATENT OFFICE 2,607,836

TIRE SAFETY INDICATOR

George S. Stevens, Richland, Wash.

Application September 29, 1950, Serial No. 187,371

1 Claim. (Cl. 177—311)

This invention relates to mechanism for indicating to the driver of a motor vehicle, by means of a suitable signal located within his normal line of vision, when any one of the tires of the vehicle loses air pressure and requires attention.

The primary object of my invention is to provide a tire safety indicator which will automatically give warning to the driver of a motor vehicle when the pressure in any one of the vehicle tires decreases to a danger point and which indicator is operated under the control of switches which respond to the transverse tilting of the vehicle as a tire begins to run flat. My indicator therefore requires no connection directly to the tire itself and after once being properly set up upon the vehicle will give long trouble-free life without further attention.

Another object of my invention is to provide a tire safety indicator with a warning lamp or other signal located upon the instrument panel of the vehicle, and tilt responsive mercury switches located adjacent and inwardly of each wheel so as to be sensitive to very minor changes in the transverse level or cant of the vehicle as any one of the tires begins to lose pressure and thereby lowers that particular portion of the vehicle.

Another and important object of my invention is to provide in connection with the indicator system as above described a means in the form of a thermostatically operated time delay element for introducing a lag in the operation of the warning signal so that the same will not be operated to give a false indication of a tire pressure loss when the vehicle sways in going around a curve or in traveling over rough road surfaces. Except if the safe driving speed is exceeded it will so indicate—for instance, if the speed is forty-five miles per hour and two or more curves are made a sixty miles per hour on indicator will be had, showing the driver of the possible danger of upset.

These and other more detailed and specific objects will be disclosed in the couse of the following specification, reference being had to the accompanying drawings, in which—

Figure 1 is a fragmentary and elevational view of one wheel and adjacent axle structure of a conventional motor vehicle and illustrating the relative location thereon of one of the control switch units according to my invention.

Figure 2 is an enlarged sectional view through one of the switch units alone and showing the same in its normal horizontal position at which it will stand when all of the tires are carrying proper air pressure and the vehicle is level.

Figure 3 is a similar view but showing the switch unit tilted, as will occur when the adjacent tire loses pressure to a danger point and showing the switch in its closed condition. For convenience in this showing the tilt angle is aggravated beyond that which will normally occur.

Figure 4 is a schematic wiring diagram of the complete signal system.

Figure 5 is a plan view, on a greatly reduced scale, of the chassis portion of a motor vehicle to show the comparative location of the four control switches and the instrument panel location of the warning signal and associated parts of the system.

In practicing my invention I provide for the conventional motor vehicle four control switch units, designated throughout generally as 10, each of which may comprise a suitable housing 11 of rectangular box-like formation and fitted with a suitable bracket 12 for firmly mounting the switch upon the axle of the vehicle. One of such switches will be arranged inwardly of each wheel of the vehicle as shown in Figure 5 there being, therefore, two of the switches upon the front axle A inward of the front wheels B and two switches on the rear axle C inward of the rear wheels D. In Figure 1 one end portion of the rear axle C is shown with the adjacent rear wheel D, and I propose to mount the switches 10 directly upon these axles since the axles themselves are primarily influenced and tilted in the transverse plane by a loss of pressure in the pneumatic tires upon the wheels which carry the axles as is readily understood. The precise mounting, however, is not material to my invention, and the bracket arrangement here shown is for example only.

Within the housing 11 of each switch 10 there is mounted a conventional mercury tube or bulb switch 13 by means of a clip 14 and since these switches are readily available upon the market no specific description is necessary herein. For use in my invention, however, each switch tube 13 has one contact 15 which is immersed in a pool 16 of mercury while a second contact 17 stands slightly above the level of this pool when the switch 10 is in its proper horizontal position. The arrangement is thus obviously such that, as the switch 10 is tilted from such position as would occur from loss of pressure in the adjacent tire of the wheel B or D, as the case may be, and as shown in Figure 3, the mercury pool 16 in seeking its own level will bridge the contacts 15 and 17 to close an electrical circuit.

Thus the switches 10 in their normal position are open and are closed when the adjacent tire loses pressure as will be readily understood.

Referring now to Figure 4, I illustrate therein the complete schematic wiring diagram of the tire safety indicator system of my invention and the switches 10 are all shown as having one terminal grounded, as designated throughout at 18. This view also illustrates the conventional battery 19 with which the vehicle is equipped for operation of the ignition, lights, etc. and the same has one terminal grounded at 20 and the other connected by a conductor 21 to the usual key operated ignition switch 22 upon the instrument panel, the latter being indicated by the dotted lines 23. Also mounted upon this instrument panel is a suitable housing 24 in which is located (nut not here shown) a socket for a warning signal such as indicated by the lamp 25. The ungrounded terminals of the control switches 10 are all joined by conductors 26 and enter the housing 24 where they are connected at 27 to a switch blade 28 having opposed contacts 29 at its free swinging end. One of such contacts normally rests in electrical engagement with a contact 30 connected to a resistance and heating coil 31 the opposite terminal of which is connected by a conductor 32 to the ignition switch 22. The arrangement is thus obviously such that the closing of any one of the control switches 10, incident to the loss of pressure in an adjacent tire or high speed around curves, will close the circuit from the battery 19 through the conductors 26, the switch blade 28 and the contacts 29 and 30 to the heating coil 31, assuming, of course, that the ignition switch 22 is itself closed, as is the case when the vehicle is in operation. The heat thus generated in the coil 31 is operative upon a bi-metal latch arm 33 which the coil encircles and the hooked extremity 34 of which normally engages the end of the switch blade 28 holding the contacts 29—30 in engagement. The switch blade 28 is, however, of spring material normally tensioned to swing the contacts 29—30 apart while the bi-metallic latch 33 is further so designed as to bend, in response to the application of the heat from the coil 31, and to move the latch end 34 clear of the end of the blade 28 after a certain interval. This then frees the blade 28 and of its normal tension it springs upward (as viewed in Figure 4) to bring the suppermost of the contacts 29 into electrical engagement with another contact 35 which is connected by a conductor 36 to one terminal of the signal lamp 25. The opposite terminal of such lamp is connected by a conductor 37 to the output side of the ignition switch 22 and thus as the thermostatic latch 33 is so operated the closed battery circuit is shifted from the coil 31 to the lamp 25 to light the latter and give warning to the operator that a tire needs attention or that his speed around curves is excessive.

The importance of the time delay thus introduced into the energization of the signal lamp 25 lies in the fact that it overcomes the giving of a false signal by the incidental closing of any of the control switches 10, caused by the canting of the axle as the vehicle travels over rough and irregular surfaces and all other similar situations. I contemplate the arrangement of the heating coil 31 and construction of the thermostatic latch 33 so as to introduce a time delay or lag of a magnitude of about 25 seconds, as an example, which is believed adequate to overcome any tendency for the lamp 25 to give a false signal while at the same time being of such short duration that tire damage could not occur before the warning signal is given.

After each such operation of the time delay mechanism the switch blade 28 will remain with the contacts 29—35 engaged until the blade is pushed downward, as viewed in Figure 4, by means of a reset button 38. Such movement by the button will snap the end of the blade 28 back beneath the hooked end 34 of the bi-metal latch arm, which will have returned to its normal position due to the previous cooling of the coil 31, which occurs quickly as the contacts 29—30 are opened.

Referring again to Figures 2 and 3 the contact 15 of the mercury switch tube 13 is shown as connected at 39 to the housing 11 to make the ground connection 18 heretofore referred to, while the opposite switch contact 17 is shown as connected to a cable directed outward through the adjacent end of the housing to act as one of the conductors 26 referred to above. Suitable grommets will, of course, be used wherever the conductors pass through the various housings and the same are designated throughout at 40.

It will be apparent from the foregoing that I have provided a warning signal system which will give a true indication of the dangerous condition of any tire of a motor vehicle, or a trailer pulled by such vehicle, also of excessive speed around curves, and which once properly set up and assembled will require no further attention than the resetting of the thermostatic time delay switch after each operation thereof. The specific details of the switches as herein disclosed may, of course, be varied in detail and the showing here are made for the purpose solely of disclosing an operative embodiment of my inventive concept.

It is understood that suitable modifications may be made in the structure as disclosed, provided such modifications come within the spirit and scope of the appended claim. Having now therefore fully illustrated and described my invention, what I claim to be new and desire to protect by Letters Patent is:

In a low pressure indicator for the pneumatic tires of a motor vehicle as conventionally equipped with a battery and connected electrical system and elements, and the said pressure indicator conventionally embodying a housing for mounting upon an end of an axle of the vehicle, and embodying a normally open control switch in the housing operative to close an electrical circuit from the battery through an electrically operable alarm signal upon the the canting of the vehicle laterally under lowered air pressure in a tire; upper and lower electrical contacts mounted medially within the housing in vertically spaced relation, the upper contact being an alarm contact electrically wired to the alarm signal, an elongated, flat and narrow switch-blade anchored at its outer end within an end of the housing and extended horizontally flatly inwardly of the housing and having its free-swinging end positioned between said vertically spaced contacts, complemental electrical contacts mounted on the opposite sides of the free end of the switch-blade and adapted for alternate engagement with the upper and lower, vertically spaced, electrical contacts as the free end of the switch-blade is moved upwardly or downwardly, an elongated bi-metallic latch anchored at its lower end within the housing, medially at the lower side thereof, and extended upwardly in longitudinal spaced alignment with the free end of the switch-blade, the upper end of said latch being hooked over the blade so as to overlie and press the free end of the blade down into engagement with the lower one of the vertically spaced electrical contacts, for closing the normal electrical circuit through the electrical system of the vehicle, a heating coil for said bi-metallic latch, said coil being electrically connected with the normal electrical circuit of the vehicle through the lower one of the vertically spaced electrical contacts, and a reset button for bearing upon and pressing down the free end of the switch-blade which is normally biased to move upwardly against the upper one of the vertically spaced electrical contacts for closing a circuit through the alarm signal aforesaid, so that the electrical contact on the under side of the blade will engage the lower one of the vertically spaced electrical contacts and the free end of the blade will spring into place underneath the hooked upper end of the bi-metallic latch for resetting the normal electrical circuit of the vehicle, whereby upon the lateral canting of one end of an axle of the vehicle through lowered air pressure of a tire, the normal functioning of the electrical system is interrupted through the closing of the normally open control switch aforesaid, and the opening of the normal circuit, and closing of the circuit through the heating coil of the bi-metallic latch and through the alarm signal as the heating coil after a time lag causes the hooked upper end of the latch to retract from the end of the switch-blade and frees same to move upward into engagement with the upper one of the vertically spaced electrical contacts for closing a circuit through the alarm signal, the said time lag in the operation of the latch thus nullifying danger of false alarm signals as the vehicle moves over rough ground or around curves.

GEORGE S. STEVENS.

REFERENCES CITED

The following references are of record in the file of this patent:

UNITED STATES PATENTS

| Number | Name | Date |
| --- | --- | --- |
| 567,599 | Kips | Sept. 15, 1896 |
| 1,415,820 | Eynon | May 9, 1922 |
| 1,492,345 | Barton | Apr. 29, 1924 |
| 1,714,501 | Eynon | May 28, 1929 |
| 1,780,673 | Eaton | Nov. 4, 1930 |

FOREIGN PATENTS

| Number | Country | Date |
| --- | --- | --- |
| 15,514 | Great Britain | of 1903 |